March 6, 1962   J. W. COLTON   3,024,082
LITHIUM CHLORIDE PRODUCTION
Filed June 27, 1957
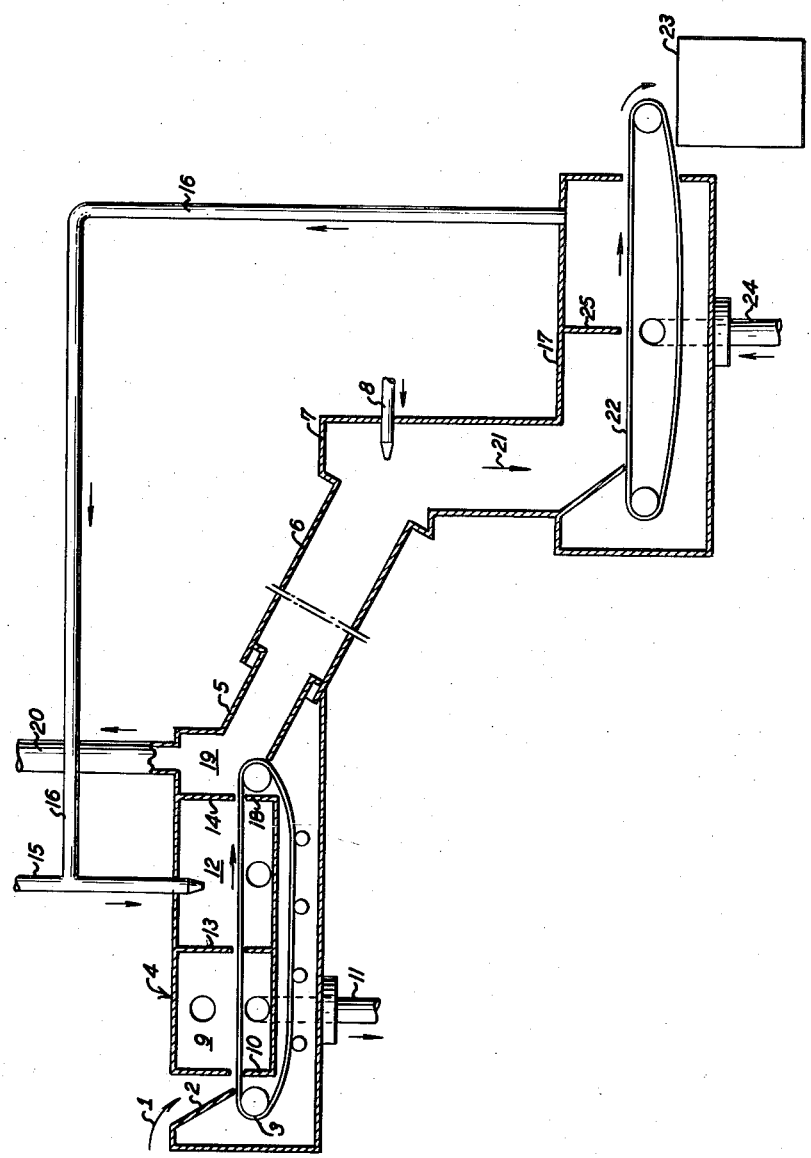
INVENTOR
JOHN WHITE COLTON
BY
ATTORNEY United States Patent Office 3,024,082
Patented Mar. 6, 1962

3,024,082
LITHIUM CHLORIDE PRODUCTION
John White Colton, Pelham Manor, N.Y., assignor, by mesne assignments, to Scientific Design Company, Inc., a corporation of Delaware
Filed June 27, 1957, Ser. No. 668,426
3 Claims. (Cl. 23—27)

This invention is concerned with a method and apparatus utilized for the production of lithium chloride-containing gases. More particularly, this invention is concerned with a method and apparatus wherein a mixture of spodumene and calcium chloride is preheated and then roasted in separate equipment to evolve a gaseous mixture which is recovered with minimum dust loading of the waste gases.

Lithium metal and lithium salts have attained considerable commercial importance and various methods have been proposed heretofore for the preparation of such salts and also the metal.

Various methods have been employed to recover lithium chloride from spodumene. For example, alpha spodumene is converted to beta spodumene at a temperature between 900° C. to 1100° C. This transformation is accompanied by a substantial increase in volume of the concentrate, which then consists of pulverulent particles of beta spodumene. It is then subjected to a light grinding operation to eliminate lumps and obtain a very fine powder which mixes and reacts readily with calcium carbonate, calcium chloride and sand when passed through a hot reaction zone such as the rotary kiln, thereby volatilizing lithium chloride and other alkali chlorides for separation and recovery of these alkali chlorides from the spodumene ore. The calcium carbonate, calcium chloride and sand components are added to modify the composition of the ore residue to provide a good grade of Portland cement.

When this feed mixture is treated as in one of the conventional methods of manufacturing Portland cement it causes serious operating difficulties. The alkali chlorides volatilize from the hotter zone of the kiln and pass with the countercurrent flow of kiln gas to a cooler zone where a large fraction of the alkali chlorides condenses. The condensed chlorides pass with the solid residues back into a hot zone where they are revolatilized. This recycle causes buildup of alkali in the solid residues in the central zone of the kiln to several times the volume of alkali chlorides in the feed, resulting in "sticky" characteristics of the kiln contents and adhesion of the contents to the kiln walls. This can result furthermore in a well defined annular ring formation in the kiln, impeding the normal countercurrent flow of solids and gases. Uninterrupted operation of the kiln is difficult or impossible under such circumstances. Therefore, the art is confronted with the problem of providing continuous, easy operation of the kiln without the problems associated with sticky characteristics of the kiln contents and ring formation.

It is an object of the present invention to provide a continuous and highly economical process for the recovery of lithium chloride which process will be free from the foregoing and other difficulties.

It is another object of this invention to provide an apparatus wherein control of temperatures and operating conditions on the separately fired pre-burning apparatus and kiln will be facilitated.

Other objects and advantages of the present invention will become apparent to those skilled in the art as the description thereof proceeds.

It has been found that lithium chloride-containing gases may be recovered in a new and useful process which comprises pre-heating a mixture of lithium ore and calcium chloride, then roasting said mixture in a separate roasting means to evolve a lithium chloride-containing gaseous mixture and recovering said gaseous mixture.

This invention in another aspect concerns, in a process for pre-heating a mixture of lithium ore and calcium chloride and then roasting said mixture in a separate roasting means to evolve a lithium chloride-containing gaseous mixture, the step of firing said pre-heated mixture in a separate firing means.

This invention in still another aspect concerns in a process for preheating a mixture of lithium ore and calcium chloride, then roasting said mixture in a separate roasting means to evolve a lithium chloride-containing gaseous mixture, the step of passing said gaseous mixture through a Venturi scrubber.

This invention in still another aspect concerns in apparatus, the combination of an ore pre-heating means, a separate roasting means and an ore roasting exit gases conduit means connected only to said roasting means.

This invention in still another aspect concerns in apparatus, the combination of a lithium ore pre-heating means, a separate ore roasting means and an ore roasting exit gases conduit means adapted to convey said exit gases to a recovery system directly and without substantial contact with said lithium ore pre-heating means.

More particularly, the following detailed description taken in conjunction with the accompanying drawing will show that the lithium chloride art has been technically advanced according to the method and apparatus of this invention wherein continuous and easy operation of the kiln is obtained while providing optimum heat transfer economy.

The drawing is a diagrammatic illustration of the process and an embodiment of an apparatus of the instant invention wherein lithium chloride-containing gases and Portland cement clinker are produced.

Referring to the figure: The moist granules of spodumene, calcium chloride, calcium carbonate and sand 1 are charged into a feed hopper 2. The hopper feeds a traveling gas-pervious grate 3, enclosed in a sectional pre-treatment apparatus 4, and forms a uniform layer of material which may be about six inches in depth. The traveling grate passes through three zones of an enclosed sectional pre-treatment apparatus to a hopper 5 feeding a rotary kiln 6 equipped with a firing hood 7 and a burner inlet 8. The first section or drying zone 9 dries the moist feed by means of hot air conveyed (not shown) from the preburning zone and passed downward through the granules on the traveling grate. An induced draft fan connected to a conduit 11 withdraws air from the bottom section 10. The second or pre-burning zone 12 partially calcines the dried kiln feedstock. This section is separated from the other zones by baffles 13 and 14 which prevent substantial heat losses to the other zones. The required burner fuel 15 which may be mixed with warm air 16 recovered from the cooling apparatus 17 is passed downward through the lithium ore on the traveling gas-pervious grate to the bottom section 18. From here, it is passed by a conduit to the top section of the drying zone, 9. The third or transition zone 19 transfers the kiln feedstock to the kiln 6. As the feedstock passes through the rotary kiln, the alkali metal components of the finely ground spodumene are volatilized as the chlorides, the major ingredient being lithium chloride. Sodium and potassium components of the ore are also volatilized as chlorides. The alkali metal chlorides pass off from the entrance end of the rotary kiln as a part of a gaseous mixture comprised essentially of carbon dioxide, water vapor, nitrogen and cement dust. The hot gases and suspended materials are withdrawn from the rotary kiln and the last section of the pre-treatment apparatus by way of conduit 20. These exit gases may be passed through a heat exchanger (not shown) to recover as much heat as possible and precipitate a major fraction of the volatilized lithium chloride and other alkali chlorides present, or may be treated in the manner disclosed and claimed in my copending application filed of even data herewith.

The ore residues from the kiln are passed downward 21 through a current of air to cool the clinker, to a conveyor 22. The warmed air passes upward and mixes with the burner fuel, then passes out the rotary kiln entrance with the exit gases. The clinker material is conveyed through the cooling zone 17 and then displaced into a storage bin 23. A draft fan connected to conduit 24 is used to force cool air through the clinker bed carried on the conveyor. A baffle 25 in the upper portion of the cooling apparatus allows a portion of the air to pass into the rotary kiln; the remainder is removed through the cooler stack 16 where it is mixed with fuel for the pre-burning zone.

It will be apparent that the described apparatus produces particular and technical advantages over the prior art. For example, in the prior art methods as discussed above, buildup of lithium, sodium, and potassium chlorides on the feedstock due to trapping of alkali fumes from the kiln exhaust gases causes ring formation in the kiln requiring periodic shutdown and produces poor fuel economy. In the described method and apparatus lithium chloride concentration on the kiln feedstock is that of the original feedstock, rather than also contain large quantities of the evolved lithium chloride. This increases capacity and provides a continuous and easy operation of the kiln without the problems associated with sticky feedstock and ring formation.

In view of the foregoing disclosure, variations and modifications thereof will be apparent to one skilled in the art and it is intended to include within the invention all such variations and modifications except as do not come within the scope of the appended claims.

I claim:
1. A process for the production of lithium chloride-containing gases, comprising preheating a mixture of lithium ore and calcium chloride in a calcining zone, passing the preheated mixture directly into a roasting zone separate from said calcining zone, roasting said mixture in said roasting zone, evolving a lithium chloride-containing gaseous mixture in said roasting zone, removing said lithium chloride-containing gaseous mixture from said roasting zone before said gaseous mixture contacts said preheated ore in said calcining zone and recovering lithium values from said gaseous mixture, the preheating step comprising drying said mixture of lithium ore and calcium chloride, partially calcining the dried mixture and passing the preheated mixture out of the calcining zone directly to the roasting zone.

2. Apparatus for the production of lithium chloride containing gas from a lithium bearing ore comprising a preheating chamber having a conveyor for the advancement of lithium ore therethrough, an inlet at one end of said preheating chamber for introducing said lithium ore onto said conveyor, an outlet at the other end of said preheating chamber for discharging preheated lithium ore, means for passing preheat gas through said preheat chamber in a reverse direction to the advancement of said lithium ore to preheat said lithium ore by contact therewith, a rotary kiln in communication with said outlet and adapted to receive preheated ore therefrom, a gas conduit intermediate said preheating chamber and said rotary kiln for withdrawing the lithium chloride gases evolved during roasting of said ore in said kiln without contacting the interior of said preheating chamber, means for transferring clinker material from said kiln to an air cooling chamber, and said air cooling chamber having an air inlet and an air outlet for introducing cooling air and withdrawing heated air, said air outlet being joined to said means for passing preheat gas through said preheat chamber.

3. The process of claim 1, wherein clinker material is air cooled and the air from such cooling is preheated, and utilizing said preheated air in said ore preheating step.

References Cited in the file of this patent
UNITED STATES PATENTS

| | | |
|---|---|---|
| 999,494 | Ellis | Aug. 1, 1911 |
| 1,224,454 | Ellis | May 1, 1917 |
| 1,250,291 | Ellis | Dec. 18, 1917 |
| 1,497,263 | Frink | June 10, 1924 |
| 1,594,689 | Pike | Aug. 3, 1926 |
| 1,843,767 | Heath | Feb. 2, 1932 |
| 2,561,439 | Erasmus | July 24, 1951 |
| 2,627,452 | Cunningham | Feb. 3, 1953 |
| 2,726,138 | Cunningham | Dec. 6, 1955 |
| 2,895,231 | Sylvest | July 21, 1959 |

OTHER REFERENCES

"Hackh's Chemical Dictionary," The Blackiston Co., 3rd ed., 1944, page 255.